(12) United States Patent
Reuber et al.

(10) Patent No.: US 9,005,833 B2
(45) Date of Patent: Apr. 14, 2015

(54) SYSTEM HAVING HIGH-TEMPERATURE FUEL CELLS

(75) Inventors: Sebastian Reuber, Dresden (DE); Markus Barthel, Dresden (DE); Mareike Wolter, Dresden (DE); Stefanie Koszyk, Freital (DE); Rico Belitz, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 130 days.

(21) Appl. No.: 13/639,131

(22) PCT Filed: Jul. 21, 2010

(86) PCT No.: PCT/EP2010/004457
§ 371 (c)(1),
(2), (4) Date: Dec. 19, 2012

(87) PCT Pub. No.: WO2011/124240
PCT Pub. Date: Oct. 13, 2011

(65) Prior Publication Data
US 2013/0089799 A1 Apr. 11, 2013

(30) Foreign Application Priority Data
Apr. 9, 2010 (DE) .......................... 10 2010 015 029

(51) Int. Cl.
*H01M 8/04* (2006.01)
*H01M 8/06* (2006.01)
(Continued)

(52) U.S. Cl.
CPC ........... *H01M 8/0618* (2013.01); *B25B 27/302* (2013.01); *B25B 27/304* (2013.01); *H01M 8/0625* (2013.01); *H01M 8/0662* (2013.01);
(Continued)

(58) Field of Classification Search
USPC .................................. 429/423, 425, 433–436
See application file for complete search history.

(56) References Cited

U.S. PATENT DOCUMENTS

| | | | | |
|---|---|---|---|---|
| 2005/0260110 | A1* | 11/2005 | Sommer et al. | 422/198 |
| 2006/0147859 | A1* | 7/2006 | Hoenig et al. | 431/156 |

(Continued)

FOREIGN PATENT DOCUMENTS

| | | |
|---|---|---|
| DE | 10310642 A1 | 9/2004 |
| EP | 1235292 A2 | 8/2002 |

(Continued)

OTHER PUBLICATIONS

Wang et al. "Natural gas processing technologies for large scale solid oxide fuel cells", Fuel Chemistry Division Preprints, 2002, 47 (2), pp. 506-507.*

*Primary Examiner* — Gregg Cantelmo
(74) *Attorney, Agent, or Firm* — Jacobson Holman, PLLC.

(57) ABSTRACT

The invention relates to a system having high-temperature fuel cells, for example SOFCs. A reformer connected upstream of the high-temperature fuel cells at the anode side, a start burner for the preheating of the cathodes of the high-temperature fuel cells, an afterburner and an operating heat exchanger are present at the system in accordance with the invention. Oxidizing agent can be supplied to the high-temperature fuel cell cathodes through the operating heat exchanger. In addition, it can be heated with the exhaust gas of the high-temperature fuel cells. Exhaust gas conducted through the operating heat exchanger can flow in an exhaust gas line together with environmental air and can then be conducted away into the environment as cooled exhaust gas.

20 Claims, 12 Drawing Sheets

Figure 1:
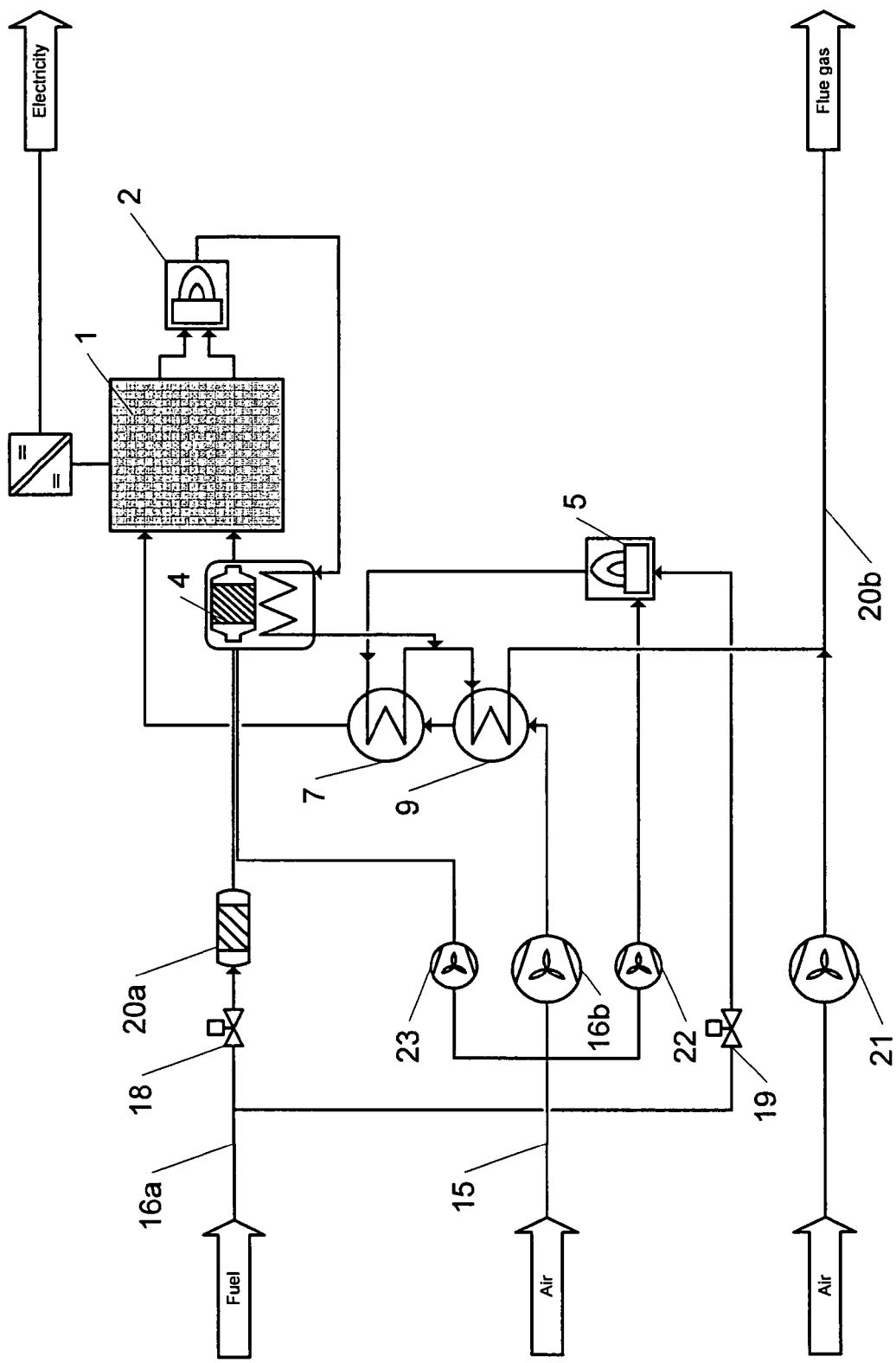

(51) Int. Cl.
  *H01M 8/12* (2006.01)
  *B25B 27/30* (2006.01)
  *H01M 8/24* (2006.01)
  *H01M 8/14* (2006.01)

(52) U.S. Cl.
  CPC ........ *H01M 8/2425* (2013.01); *H01M 8/04014* (2013.01); *H01M 8/04022* (2013.01); *H01M 8/04268* (2013.01); *H01M 2008/1293* (2013.01); *H01M 2008/147* (2013.01); *H01M 2250/20* (2013.01)

(56) References Cited

U.S. PATENT DOCUMENTS

| | | | |
|---|---|---|---|
| 2007/0148513 A1* | 6/2007 | Pastula et al. | 429/26 |
| 2007/0196267 A1* | 8/2007 | Carpenter et al. | 423/648.1 |
| 2008/0118800 A1* | 5/2008 | Devriendt et al. | 429/26 |
| 2008/0318091 A1* | 12/2008 | Kusnezoff et al. | 429/13 |
| 2009/0104484 A1 | 4/2009 | Fujimura et al. | |
| 2009/0253005 A1 | 10/2009 | Muehlner et al. | |
| 2010/0015491 A1* | 1/2010 | Yamanis | 429/30 |

FOREIGN PATENT DOCUMENTS

| | | | |
|---|---|---|---|
| JP | 2002 208427 A | 7/2002 | |
| JP | 2002/289244 A | 10/2002 | |
| JP | 2003/083515 A | 3/2003 | |
| JP | 2007234374 A | 2/2006 | |
| JP | 2007/070130 A | 3/2007 | |
| JP | 2008/166233 A | 7/2008 | |
| JP | 2008/524817 A | 8/2008 | |
| JP | 2009/303099 A | 12/2008 | |
| JP | 2009/531830 A | 9/2009 | |
| JP | 2010 020966 A | 1/2010 | |
| WO | WO 2005078843 A2 * | 8/2005 | |
| WO | WO 2008/053213 A1 | 5/2008 | |

\* cited by examiner

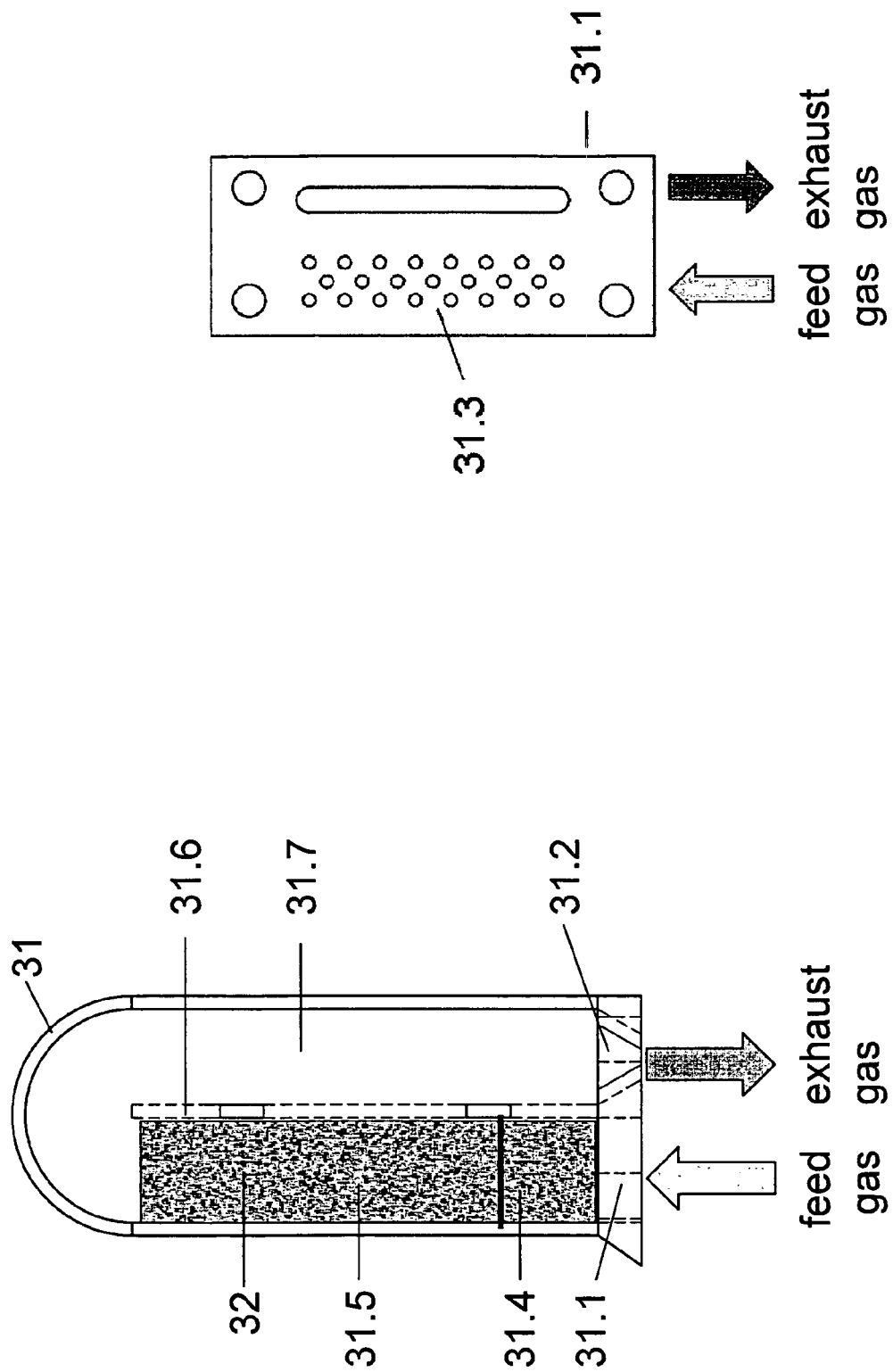

SYSTEM HAVING HIGH-TEMPERATURE FUEL CELLS

This is a national stage of PCT/EP10/004457, filed Jul. 21, 2010 and published in English which has a priority of German no. 10 2010 015 029.0, filed Apr. 9, 2010, hereby incorporated by reference.

The invention relates to a system having high-temperature fuel cells, for example SOFCs. It is in particular provided for mobile use. In this respect, the high-temperature fuel cells are preferably of plate-shape and are present in a stacked arrangement.

It is intended to provide electrical energy on a 12V basis for a storage in a storage battery or directly for the user while converting energy of an energy carrier containing hydrocarbon, for example butane, propane, LPG or bioethanol.

In this respect, the thermal integration of the required system components in order to avoid the high thermal losses due to the poor surface-to-volume ratio known in accordance with Bergmann's Rule is a particular challenge, in particular for small high-temperature fuel cell systems.

High-temperature fuel cell systems require a relatively long heating time due to their high working temperature and are therefore preferably interesting for combined heat and power applications (CHP applications) in stationary operation. Considerably more cold cycle starts may be necessary in mobile use in comparison with stationary CHP applications so that a greater lack of sensitivity to thermo-cycles should be present. The heating to the required operating temperature has to be carried out more frequently on a mobile use, whereby the efficiency is reduced and the time of use is restricted. A utilization of the waste heat is frequently not possible and also not desired. However, the safety requirements for users and the environment must also be satisfied.

Predominantly low-temperature fuel cells are used for mobile applications; however, they require a modified process management.

A modular design of a high-temperature fuel cell system is described in DE 10310642 A1. In this respect, a vertical arrangement of the system components is proposed in which all the components should be vertically connected to a gas feed. No thermal coupling of afterburner and fuel cell stack takes place; a separation should rather be achieved via a connecting plate. A start burner for the heating up is not provided.

It is therefore the object of the invention to provide a system having high-temperature fuel cells which is suitable for a mobile use with frequent start cycles and in this respect with a shortened heating time and such that a sufficient safety is present during operation.

In accordance with the invention, this object is achieved by a system having the features of claim 1. It can be operated using a method in accordance with claim 17. Advantageous embodiments and further developments of the invention can be achieved using features designated in subordinate claims.

In a system in accordance with the invention having high-temperature fuel cells a reformer is connected upstream of the high-temperature fuel cells at the anode side. In addition, a start burner is present for the preheating of the cathodes of the high-temperature fuel cells. With an afterburner, components of the fuel and of the oxidizing agent which are not converted in the electrochemical reaction can be oxidized at least approximately completely and the exhaust gas can then be supplied to an operating heat exchanger through which oxidizing agent can be supplied to the high-temperature fuel cell cathodes. The oxidizing agent is in this respect preheated with the exhaust gas of the high-temperature fuel cells during the operation of the system before the entry into the cathodes.

In addition, exhaust gas conducted through the operating heat exchanger is conducted into an exhaust gas line together with environmental air and is mixed. This gas mixture can be led off into the environment without risk as cooled exhaust gas since a cooling to a temperature of a maximum of 75° C., preferably of 50° C., is possible.

To avoid damage to system components, any elements containing sulfur which are present should be catalytically absorbed in a desulfurization device prior to the fuel preparation in the system.

To simplify the system, a dry reforming process should be used for the reforming of the starting fuel to a fuel which is rich in hydrogen and which substantially comprises CO and $H_2$. A catalytic partial oxidization with air (CPOx) can therefore be used.

The fuel leaving the reformer after the reforming can be supplied to the anodes of the fuel cells and can be electrochemically converted using an oxidizing agent, preferably air, supplied at the cathode side. The oxidizing agent is in this respect preheated at least during the operation before it moves into the fuel cells. The oxygen ions (O2-) contained in the oxidizing agent can diffuse through the electrolyte from the cathode to the anode and a conversion to $CO_2$ and $H_2O$ takes place. A DC-DC converter can feed in an electrical voltage level suitable for utilization in the electrical system part for the consumer independently of the electrical input voltage of the fuel cells.

Non-converted fuel is subsequently mixed with the exhaust gas of the cathodes and is completely oxidized, preferably catalytically, in the afterburner. The reformer can likewise be heated with the hot afterburner exhaust gas. The efficiency of the reformer can thereby be considerably increased. The waste heat of the afterburner can be utilized for the preheating of the cold system components by a favorable constructive design and arrangement of the afterburner. An additional heating of the reformer can be achieved in a simple form in that it is flowed around by exhaust gas from the afterburner. The exhaust gas of the afterburner can in this respect flow through a hollow space or at least through a passage, wherein said hollow space or said passage may be present in the housing of the reformer, before the exhaust gas is supplied to the operating heat exchanger. Exhaust gas from the high-temperature fuel cells can thus also be used solely or additionally.

A start burner is present for a cold start of the high-temperature fuel cell system and is preferably operated with the same fuel which is also supplied to the reformer. For a short heating of the system, the hot start burner exhaust gas should be able to be used as directly as possible for the heating of the high-temperature fuel cells.

In this respect, in an alternative, it can be supplied directly to the cathodes during the heating phase. In a further alternative, there is, however, also the possibility of supplying the exhaust gas of the start burner to a heat exchanger connected downstream of the operating heat exchanger.

The hot exhaust gas of the start burner can in both cases be utilized for the preheating of the cathodes to the required operating temperature of the high-temperature fuel cells at which the electrochemical reaction can take place in the fuel cells.

The still heated exhaust gas of the start burner removed from the fuel cells is supplied to the operating heat exchanger and can in this respect also preheat the reformer during the heating phase. If the exhaust gas of the start burner is supplied to the further heat exchanger, the oxidizing agent can be heated in two stages during the heating phase.

The operating heat exchanger acts as a cathode air preheater after heating has taken place in stationary operation, that is, after reaching the required operating temperature. After the switching off of the start burner, the exhaust gas exiting the afterburner can be coupled between the two heat exchangers after being led through the reformer.

If no additional start heat exchanger is present in a system in accordance with the invention and if the exhaust gas of the start burner moves directly, or after mixing with oxidizing agent exiting the operating heat exchanger, directly to the cathode side of the fuel cells, the latter can be heated directly with the exhaust gas of the start burner. An ideal gas temperature can be achieved with a minimal heating time with a simplified regulation effort by the mixing in of oxidizing agent and fuel gas. At the same time, critical temperatures for the fuel cells can be avoided by the mixing.

Less additional power for compressor/fan is required by a dispensing with of a start heat exchanger since the compressor can be operated with a lower throughput for oxidizing agents and the air ratio of the start burner can nevertheless be kept in an ideal range (1.1<air ratio start burner<1.6).

It is also advantageous that CO peaks, which are unavoidable in the system start phase, can be oxidized directly in the afterburner and thus do not represent any danger for the user. With this configuration, the system can be heated in parallel with the start burner and the reformer from a specific temperature onward since residual oxygen is still present in the fuel exhaust gas. The desired short heating time can thereby be further shortened. The exhaust gas from the afterburner can already be utilized for a heat recovery before the switching off of the start burner and can be supplied at least to the operating heat exchanger for the preheating of the oxidizing agent.

A porous burner can be used as a start burner, as also for the afterburner, and can be operated over a large temperature range and operating range. The heating power can be gradually reduced in the course of the heating phase due to the preheating of the oxidizing agent supplied to the burner and the heat input into the fuel cells can nevertheless be held high. Such an arrangement reduces the required heating energy noticeably and thereby achieves a substantially increased efficiency. Optionally, the oxidizing agent can be set for a specific temperature range during the heating phase by a bypass line at the operating heat exchanger.

The hot residual exhaust gas is mixed with environmental air after the heat recovery to cool it to a temperature of approximately 50° C. not critical for the operating safety before the exhaust gas is conducted to the environment. The environmental air mixed to the hot residual gas can be conducted in the system such that it can cool electronic components of the system before the mixing into the residual exhaust gas. At the same time, in the case of a leak, non-combusted fuel can be diluted with the environmental air utilized for cooling and can be led off without danger to the environment.

Such an arrangement of the system components enables a minimal use of an actuator system and sensor system for the fluid control. In the variant in which the exhaust gas of the start burner is conducted directly to the cathodes and in which a separate compressor for the supply of oxidizing agent to the start burner is dispensed with, an additional sensor system for the start burner exhaust gases is thus dispensed with since they are covered by the measurement of the cathode oxidizing agent temperature. Advantageously, proportional valves can thus be attached to the lines for the fuel conduction, whereas the different process gas volume flows can be controlled or regulated only via the required compressor/fan. Alternatively, with a pressure level present, venturi nozzles can also be used instead of fans as the compressor.

The fluid conduction can take place within a sophisticated channel system which is integrated into the components. A small construction volume is thus achieved and simultaneously a complex and/or expensive piping is omitted. A variety of geometrical flow shapes and flow conductions can be realized relatively simply by a specially soldered plate structure. The flow conduction can be selected so that a minimum of deflections and cross-sectional restrictions arises to achieve small system pressure losses. For this purpose, with an adapter plate with integrated mixture formation which can be used in the system, a channel system can be formed through which reformed fuel gas and oxidizing agent are supplied to the high-temperature fuel cells, said channel system having openings formed in plates stacked above one another. Different channel geometries and a flow conduction curved as required can be realized by corresponding cut-outs in the plates.

As a special feature, the coupling of the stacked fuel cells and the afterburner can be seen on a common adapter plate with integrated mixture formation in the first embodiment variant with starter heat exchanger and operating heat exchanger. Ideally, the afterburner can be positioned such that it actively preheats the "cold" oxidizing agent inlet side of the fuel cell stack by radiation heat exchange and thus provides a more homogenous temperature distribution and, respectively, better efficiency of the fuel cells. The gas infeed and outfeed and the mixture of the residual anode gas and the waste cathode gas of the fuel cell stack can take place within a special adapter plate. The hot afterburner exhaust gas can be conducted directly onto the reformer without any deflection. The starter heat exchanger can be arranged at the lower side of the adapter plate and thereunder the operating heat exchanger can be arranged directly thereat by means of an intermediate plate. The hot components are thus separated from the cold ones and the system can keep is operating temperatures constant better in stationary operation. Since the start burner can be operated with an air number>1, and since, in this process, air can additionally be mixed in, the burner exhaust gas still contains a high portion of residual oxygen which can be utilized for the reduction in cathodes of the fuel cells.

In an embodiment variant without any starter heat exchanger at the lower side of the fuel cell stack, instead of the starter heat exchanger, the catalytically coated afterburner can be arranged in an integrated manner at its position. The shape of the afterburner can be designed such that it can be built in around the reformer. This afterburner provides an additional heating of the oxidizing agent supplied to the cathodes with its reaction heat in stationary operation before entry into the fuel cell stack. The oxidizing agent supplied to the fuel cell stack can be conducted past its outer side in a channel for preheating.

The preferably catalytic CPOx reformer is arranged transversely beneath the fuel cells in this embodiment variant and can conduct reformed fuel gas to the anodes without heat losses and thus with reduced soot formation due to its arrangement in the hot system part. The air ratio of the process can also be reduced to a minimum here due to an outer jacketing of the reformer with the afterburner, which effects a high electrical system efficiency in comparison with unheated POx reformers.

The start burner can then be positioned to the side beneath the fuel cells so that the hot exhaust gas can contribute directly to the heating of the fuel cell stack without any thermal losses where possible. At the same time, a sufficiently long inlet path for a mixing with preheated oxidizing agent from the operating heat exchanger is present. The thermal coupling of the start burner with the operating heat exchanger additionally improves its transfer behavior in the start phase due to heat conduction from the hot start burner to the operating heat exchanger. The start burner and the operating heat exchanger can in this respect be thermally separated from the reformer.

The exhaust gas pipe from the operating heat exchanger should stand for an increased heat recovery in thermal contact with the supply channel for the oxidizing agent into the system. At the same time, a double pipe inserted at the reformer can be led through the insulation and it thus additionally contributes to the cooling of the fuel cell stack. The heat recovery efficiency is thus maximized and the operating heat exchanger can be made with a reduced exchange surface.

An efficient and reliable operation of the system in accordance with the invention can also be achieved in mobile use with a very small dimensioning due to the sophisticated constructive design and arrangement of the components. A favorable temperature management can thus be achieved by thermal separation with an arrangement of the hot components of the system in the upper part and of the components with a colder temperature range in the lower part. An integrated afterburner between the fuel cell stack and the operating heat exchanger can prevent the fuel cell stack from cooling down in one region and in this respect its exhaust heat can simultaneously be used for the heating of the reformer and of the oxidizing agent supplied to the cathodes. An overheating of the fuel cell stack can be prevented by a skillful positioning of the afterburner.

A system in accordance with the invention can be provided as a technically very simple and inexpensive embodiment of a portable fuel cell system. Only a minimum of technical measurement, control and regulation systems and actuator systems is in particular required by the process management possible in this manner. Due to the integration of the start burner in the oxidizing agent train, there is the possibility of heating the fuel cell stack in parallel by means of the start burner and the $CPO_x$ reformer. Only a minimum of heating time is thus required and the start burner can be dimensioned smaller with the same heating time, in contrast to known system configurations. A maximum of heat recovery can be achieved by the heating of the oxidizing agent supplied to the start burner, with the start burner performance simultaneously being able to be reduced during the heating phase. The start burner enables an ideal performance adaptation for the system regulation in comparison with non-heated $CPO_x$ reformers.

If the start burner has been arranged integrated between the operating heat exchanger and the fuel cell stack, an expensive separate fan as a compressor for the start burners can be dispensed with.

The fluid flows can be conducted easily and without unnecessary construction volume thanks to the internal mixture formation in an adaptor plate and to the mixing. If the pressure losses are too high in a region, it is possible to counteract this by a simple widening of the respective flow channel.

Due to the coupling of the afterburner and to the integrated arrangement of the reformer within the afterburner and beneath the fuel cell stack, its exhaust heat can be utilized thermally ideally for the process management. The oxidizing agent supply for the fuel cell stack can be designed such that it is additionally heated prior to entry into the fuel cell stack. An additional homogenization of the temperatures in the fuel cell stack can thus be achieved.

A geometrically similar structure of the fuel cell stack and the operating heat exchanger reduces the development costs and allows a simple modulation and integration of the components of the system. A very high packing density of the system components can be achieved by this arrangement.

A cooling air intake in the channel between the insulation layer and the housing before the mixture with the system exhaust gas avoids an overheating of the electrical and electronic components and reduces the surface temperature of the insulation.

An afterburner can be used in a system, in particular for the taking into account of fluctuations in the exhaust gas composition due to operating conditions, and in this respect also of different stoichiometric conditions or lambda values, in which afterburner a structure is present within a housing as a carrier of at least one catalytically active component, said structure being able to be flowed through by the exhaust gas from the anodes and the exhaust gas of the cathodes containing oxygen. A catalytically active component can in this respect be a catalytically active chemical element, an alloy of this chemical element and/or a chemical compound. The exhaust gas mixture formed with the two exhaust gas flows can be introduced into the housing via an inlet. It is catalytically posttreated in the housing and is in this respect further oxidized or oxidized as completely as possible. A structure can, however, also be used which is formed from a catalytically active material.

A homogeneous postcombustion and also a catalytic oxidizing can be carried out. In this respect, a zone which is first flowed through by the exhaust gas mixture and in which only a homogeneous oxidizing reaction takes place, without a catalytically influenced reaction of the oxidizable components contained in the exhaust gas mixture, can be arranged in the housing and, subsequent thereto, a second zone can be arranged in which the structure is made catalytically active.

The exhaust gas mixture can in this respect be oxidized without any further support in the first zone, also while taking account of the high temperature and of the there higher portion of non-oxidized components or of components not completely oxidized. A further oxidizing can then takes place solely with catalytic assistance if the exhaust gas mixture flows further through the housing and through the second zone in which the carrier structure is formed to act catalytically.

In the first zone, a hollow space or also a structure which can be flowed through by the exhaust gas mixture can be present which has no catalytically active component. On the flowing through of the structure in this zone, a further mixing of the two exhaust gas flows can be achieved, which can have an advantageous effect on the subsequent catalytic oxidizing.

The catalytically posttreated exhaust gas can be removed via an outlet for the utilization of its residual heat. A device for the avoidance of reignitions into the high-temperature fuel cell system can moreover be present at the inlet of the afterburner.

A porous structure suitable for the afterburner can be made in the form of an open-cell foam, sponge or of a fiber structure.

The structure can, however, also be completely catalytic and in this respect be formed solely from a catalytically active material. It can be a catalytically active perovskite ceramic material.

In this respect, a structure can be formed as a monolith or also as a bulk formation of fibers, particles or of a granulate. Only a sufficiently large porosity is necessary. Monoliths having a honeycomb structure can thus be formed.

The structures as a carrier structure can be formed from sufficiently thermally stable metal or metal alloys, preferably, however, also from a ceramic material. This can, for example, also be SiC in the form of SSic or LPSSiC, with the respective manufacturing process determining the shape of the SiC.

The surface of the structure can be coated with a coating increasing the specific surface. This coating is usually called a "washcoat" and can be formed with aluminum oxide, for example.

At least one catalytically active component can be applied to or contained on the surface of the structure or of the coating increasing the structure. The charging with a catalytically active component can be achieved by wet impregnation, for example.

Platinum, gold, palladium, rhodium, manganese or nickel can be used for catalytically active components. A combined use of a plurality of these elements, for example a common use of platinum and nickel, is favorable.

It is not necessary to provide an additional connection for a supply of an additional fuel gas and oxygen or of a gas mixture containing oxygen. An operation of the afterburner exclusively with the exhaust gases of the process can take place, with the total exhaust gas of the system being conducted through the afterburner.

The invention will be explained in more detail in the following with reference to examples.

Figure 2:
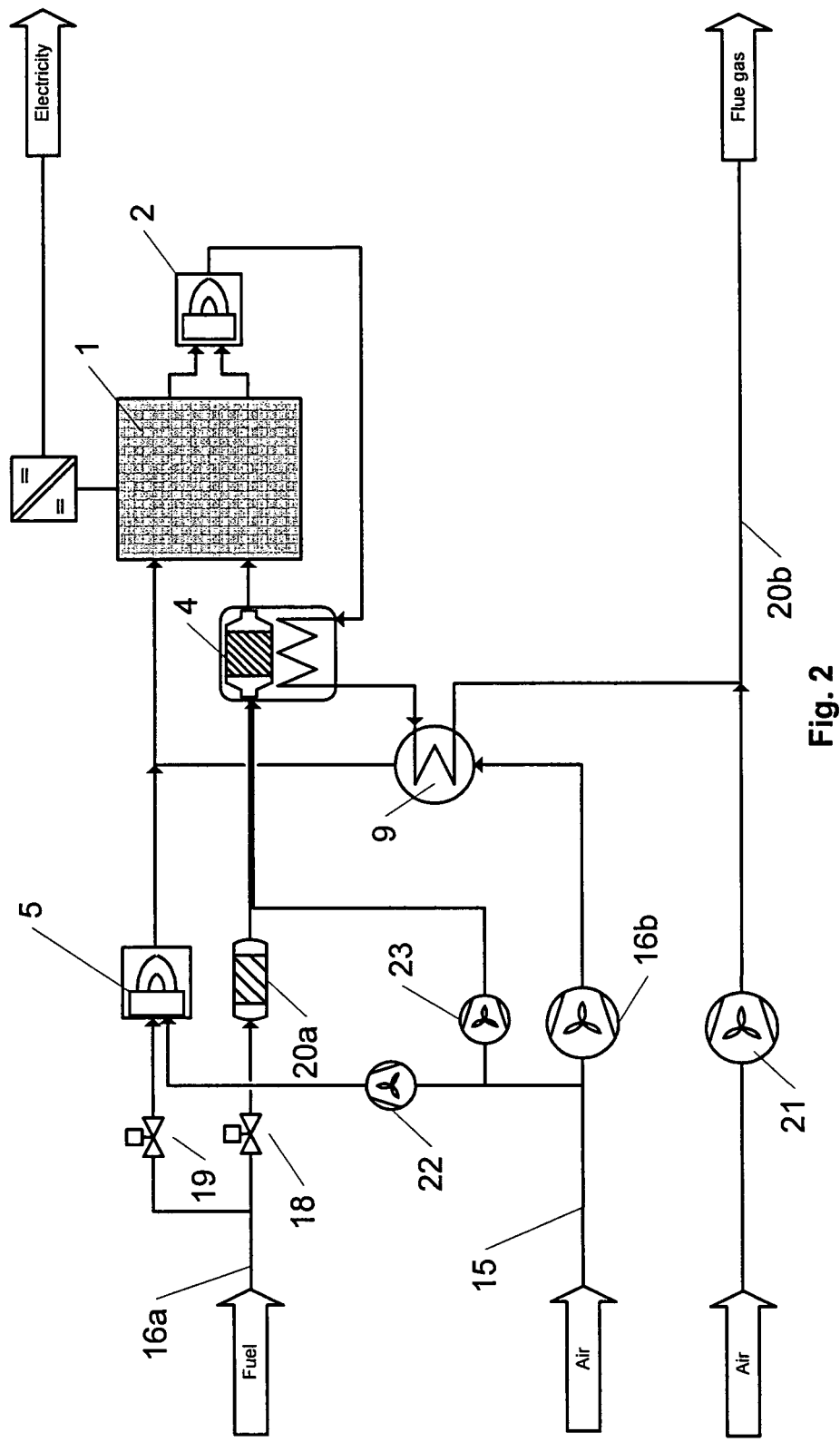
Figure 3:
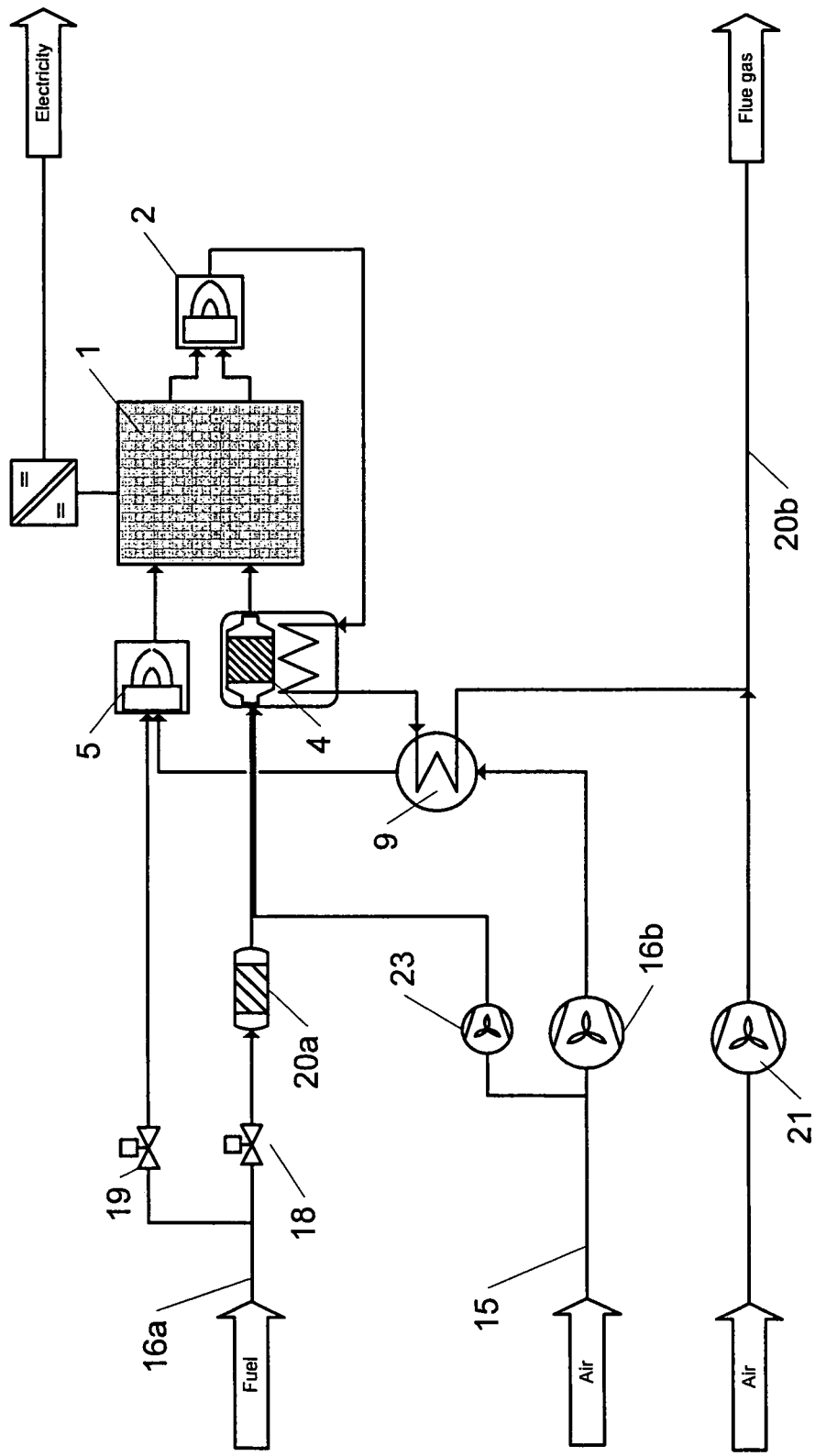
Figure 4:
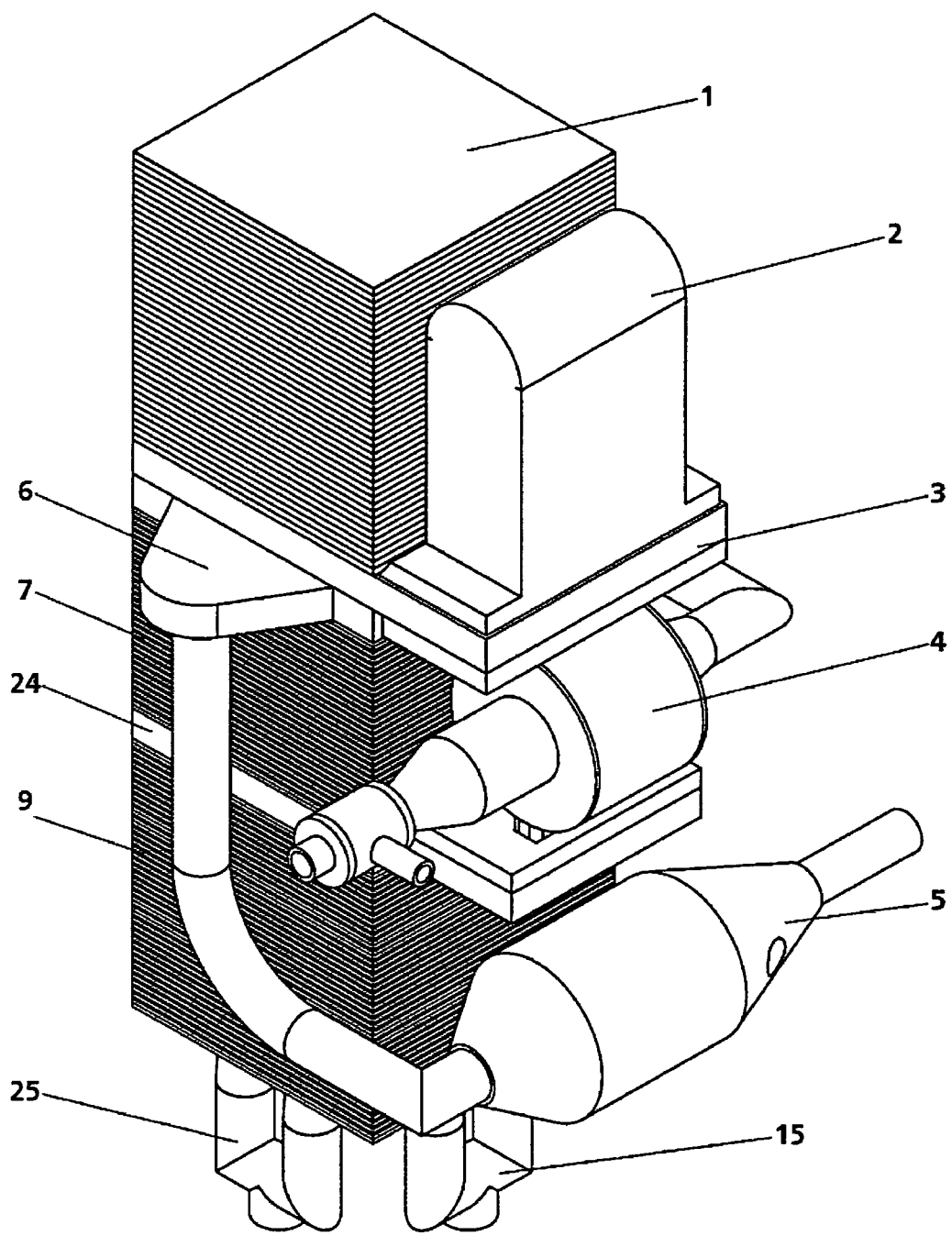
Figure 5:
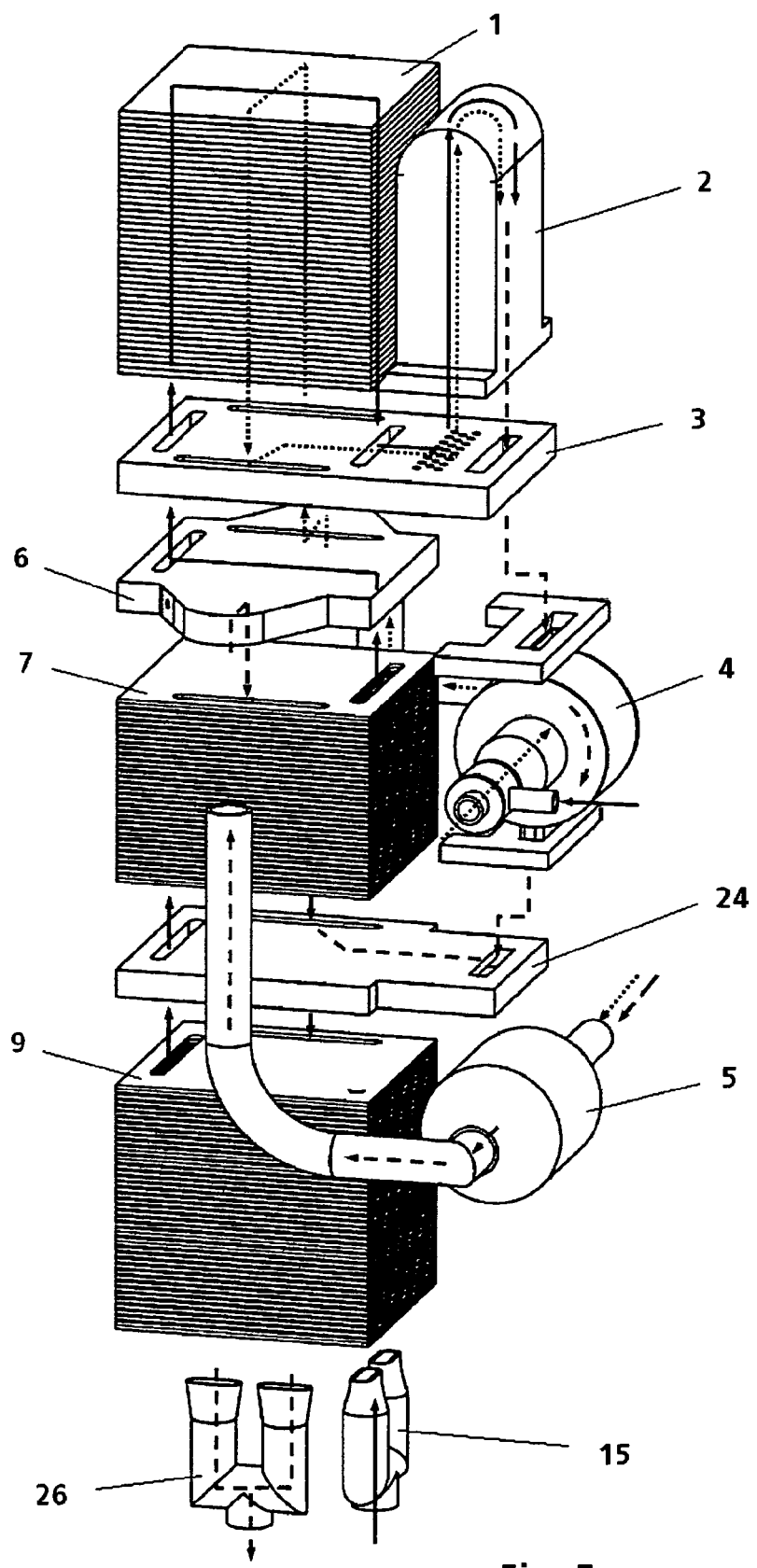
Figure 6:
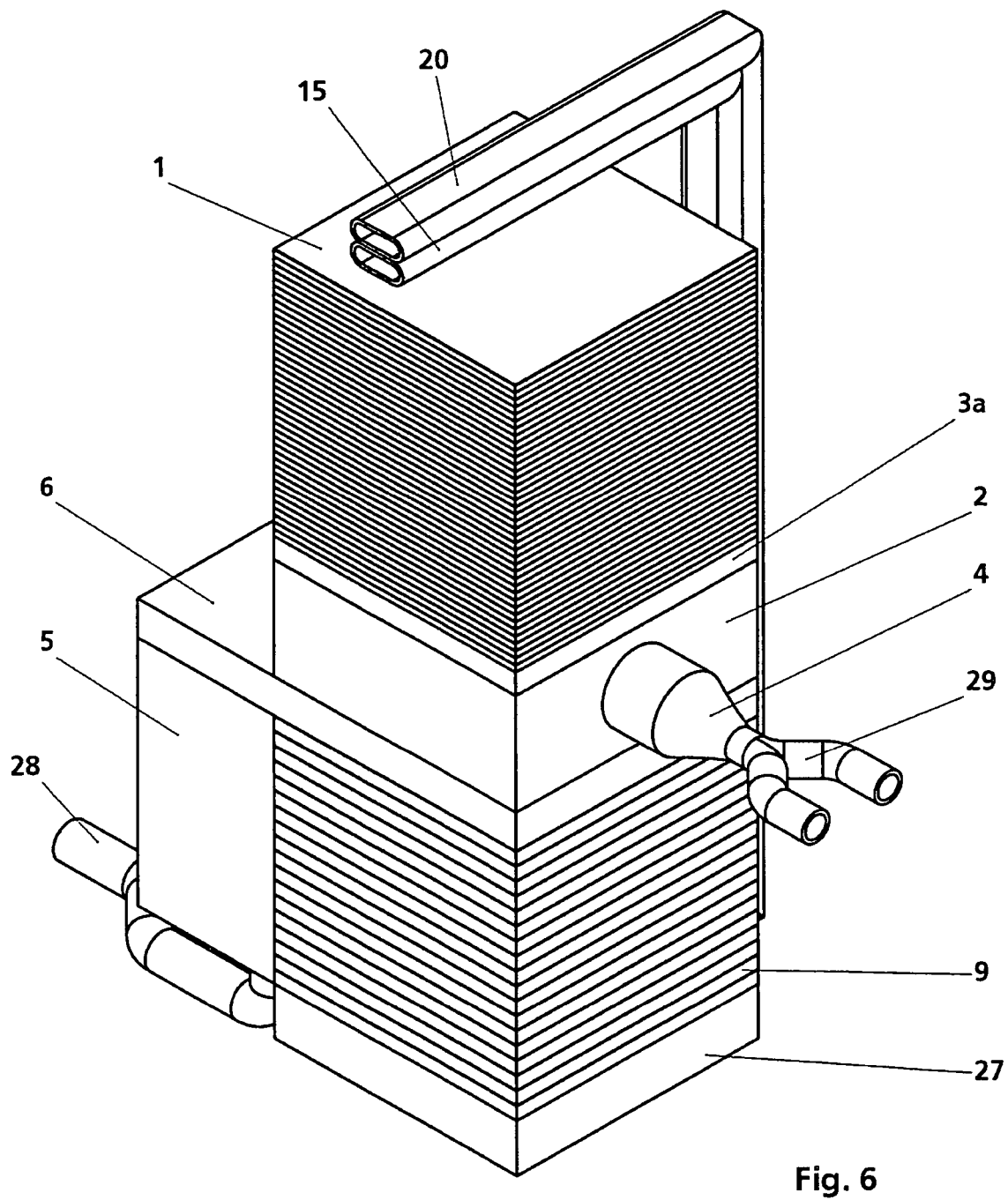
Figure 7:
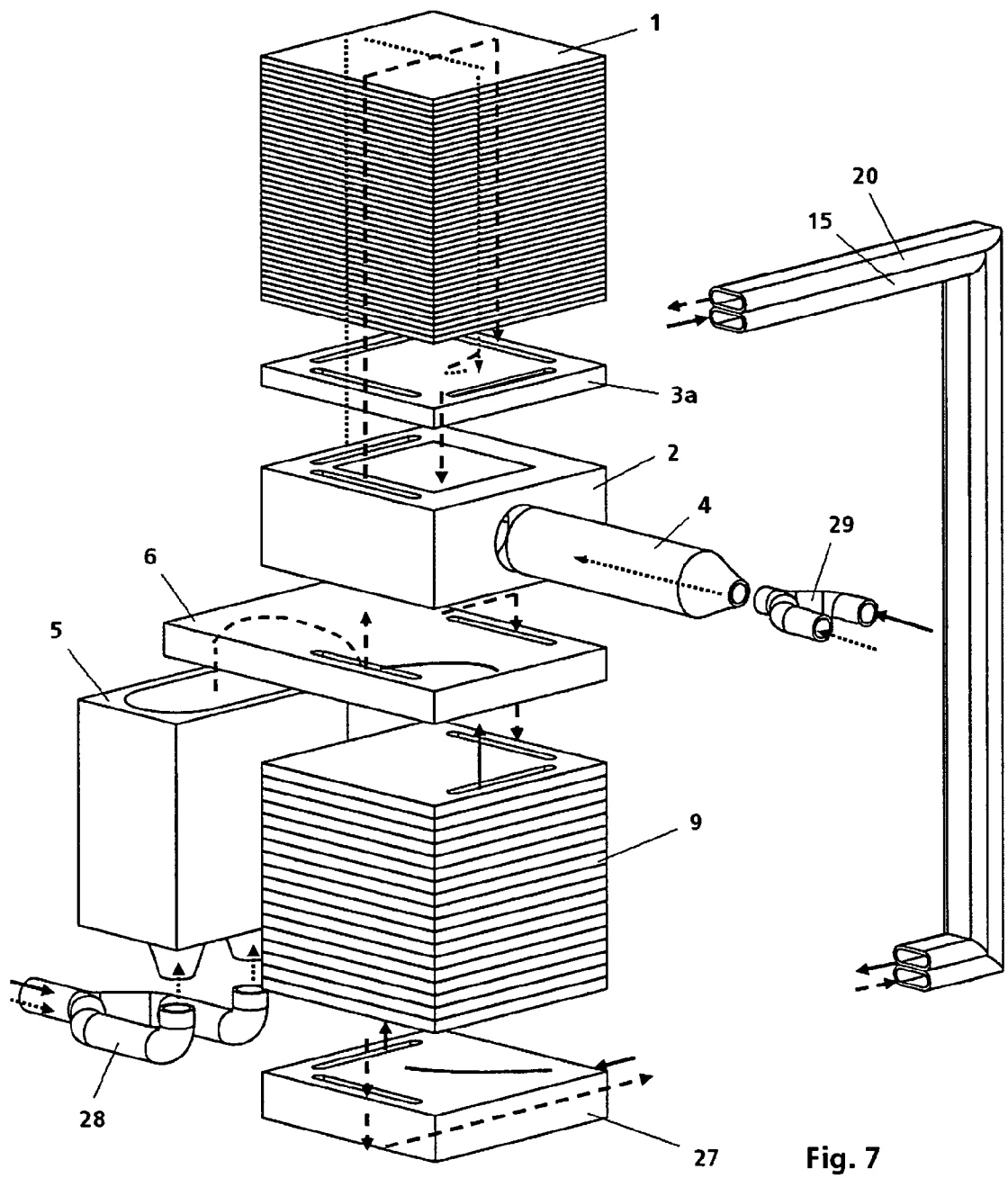
Figure 8:
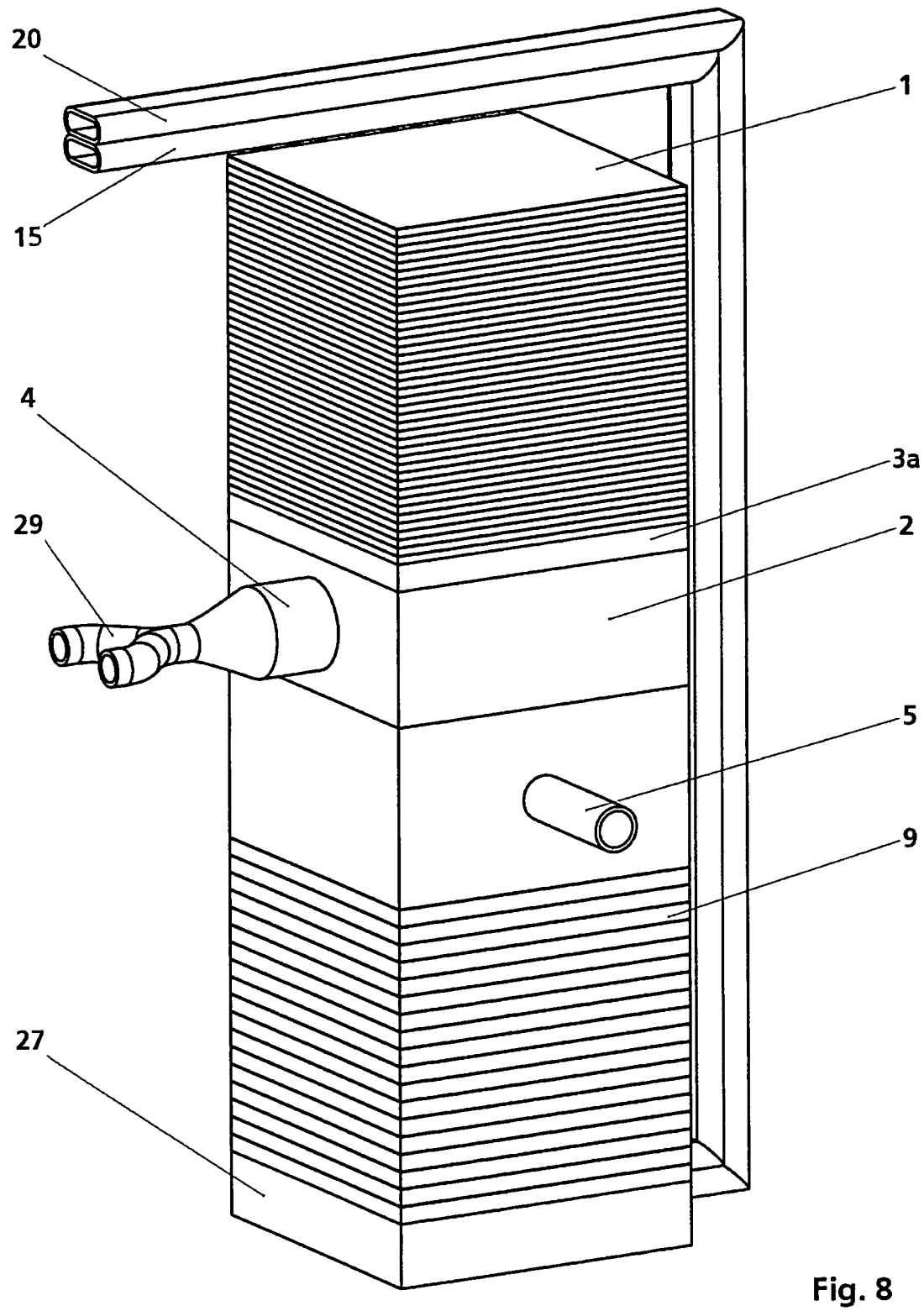
Figure 9:
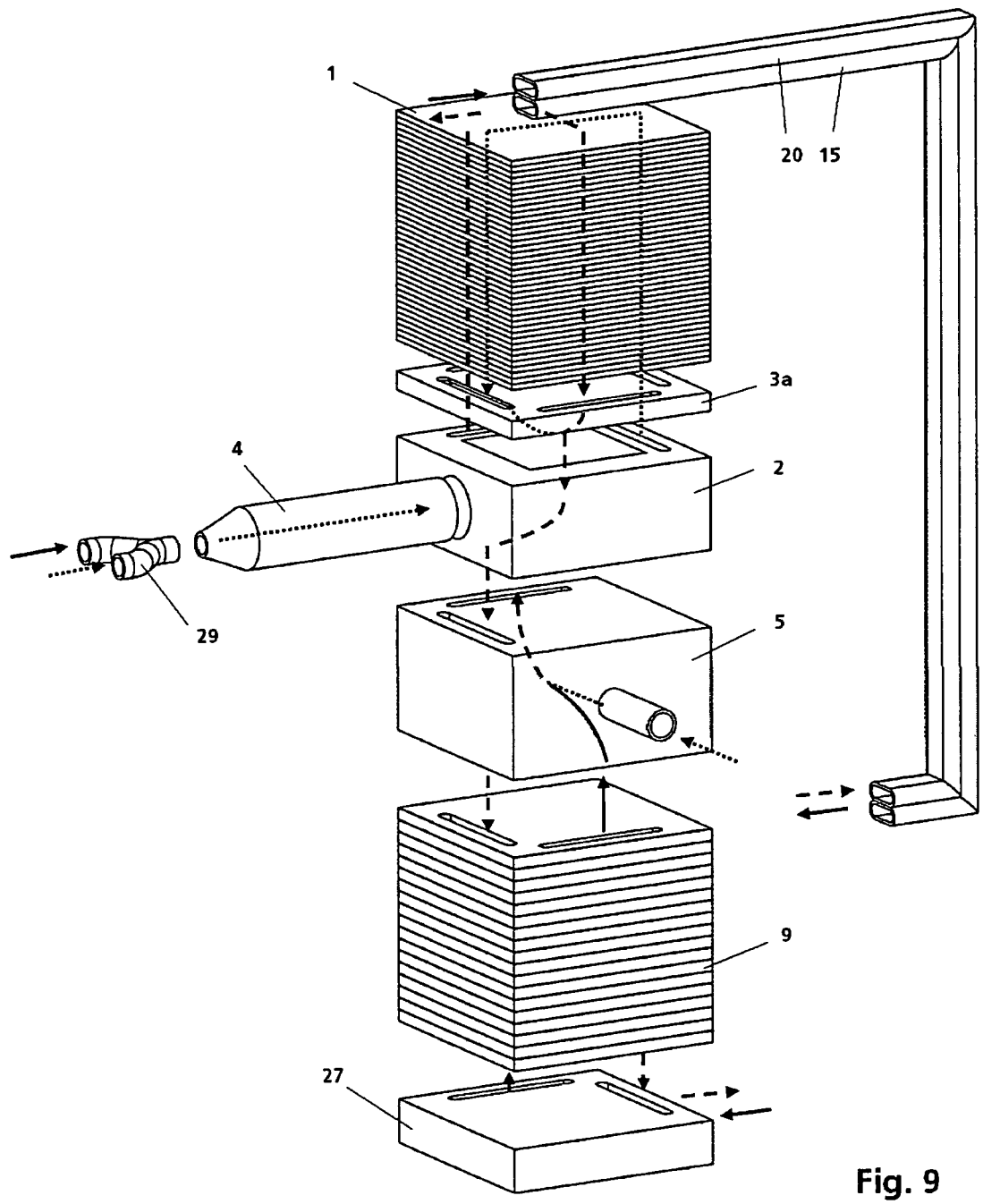
Figure 10:
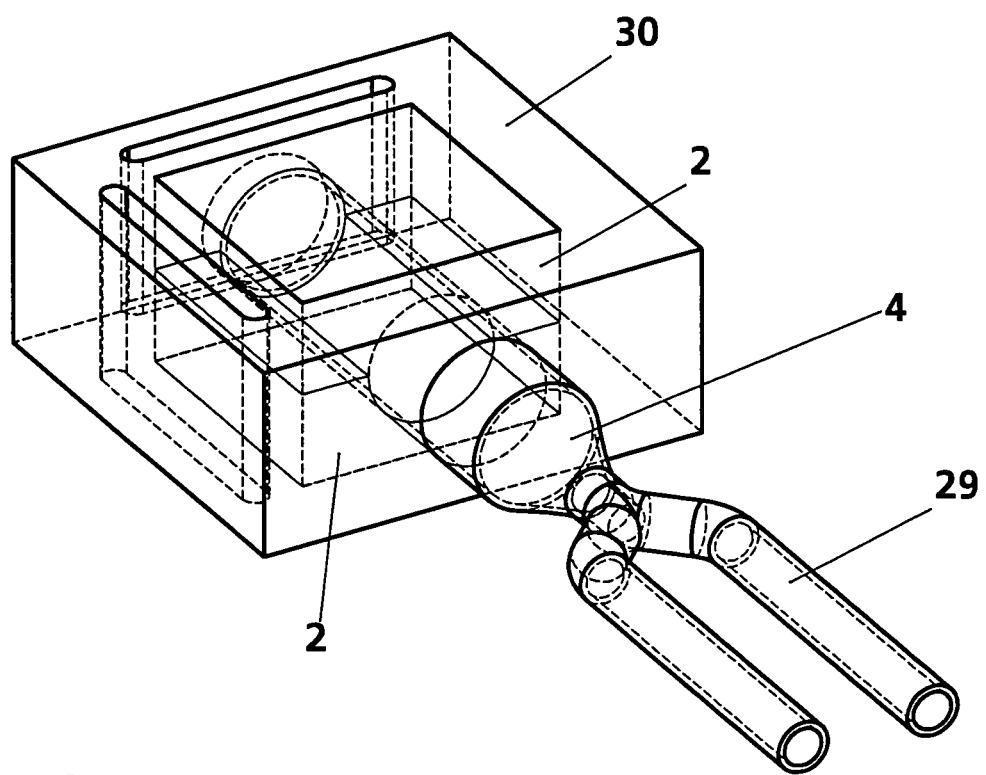
Figure 11:
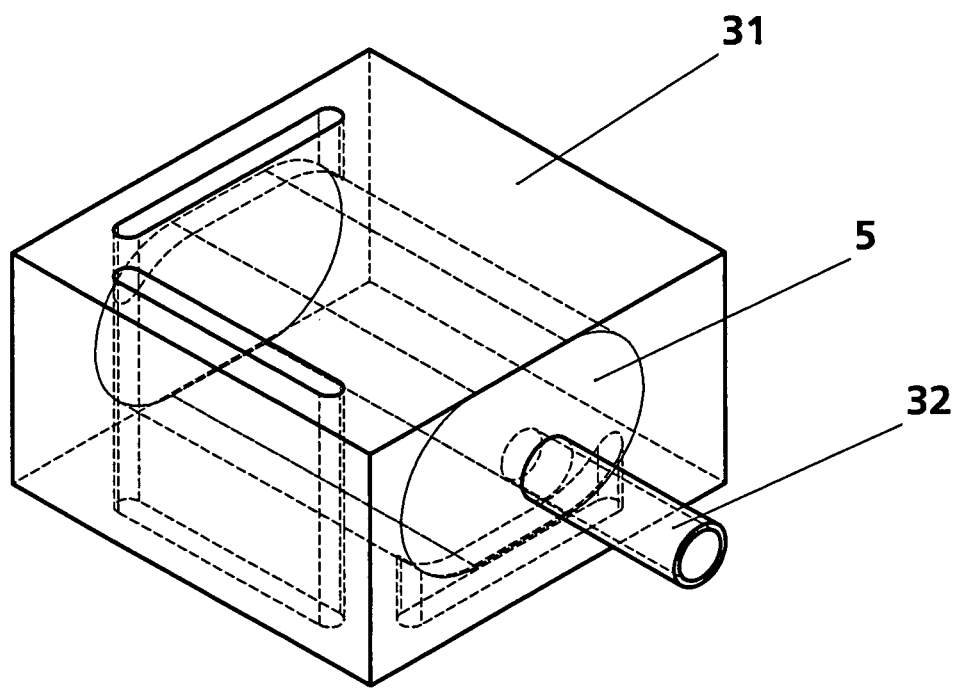

There are shown:

FIG. 1 a schematic diagram for a first example of a system in accordance with the invention;

FIG. 2 a schematic diagram for a second example of a system in accordance with the invention;

FIG. 3 a schematic diagram for a third example of a system in accordance with the invention;

FIG. 4 a perspective representation of an example of a system in accordance with the invention;

FIG. 5 an exploded representation of the example of FIG. 4;

FIG. 6 a perspective representation of a further example;

FIG. 7 an exploded representation of the example of FIG. 6;

FIG. 8 a perspective representation of a further example;

FIG. 9 an exploded representation of the example shown in FIGS. 6 and 7 in a different perspective;

FIG. 10 a perspective representation of a reformer arranged integrated in an afterburner for a system in accordance with the invention;

FIG. 11 a start burner usable in the invention;

FIG. 12A a sectional representation through an example of an afterburner usable in a system in accordance with the invention; and FIG. 12B the afterburner of FIG. 12A in a view from below.

A schematic diagram of a first example is shown in FIG. 1. In this respect, air is conducted as an oxidizing agent via the line 15 via a fan 16 through the operating heat exchanger 9, from there through the starter heat exchanger 7 and then, at the cathode side, to the stacked fuel cells 1. The fuel moves via the line 16 via a distributor to the start burner 5, on the one hand, and to the reformer 4, on the other hand. The volume flows can be influenced by the proportional valves 18 and 19. Sulfur from the fuel-absorbing element 20a is arranged before the reformer 4.

The total exhaust gas of the fuel cells 1 is postoxidized in the afterburner 2 and is then conducted to the reformer 4 for its heating and then to the operating heat exchanger 9. The reformer 4 and the air supplied to the cathodes of the fuel cells 1 are thus heated with the residual heat in normal operation.

In the heating phase up to the reaching of the operating temperature above 700° C., the proportional valve 18 is closed and fuel moves from a store, not shown, through the open proportional valve 19 to the start burner 5 in which it is oxidized. The air is heated in the starter heat exchanger 7 with the exhaust gas of the start burner 5 and is then conducted through the cathodes of the fuel cells to heat the fuel cells 1 to the required operating temperature. The heated air exiting the fuel cells 1 can output its residual heat to the reformer 4 and to the operating heat exchanger 9. There is basically also the possibility of keeping both proportional valves 18 and 19 open simultaneously and of operating the reformer 4 and the start burner 5 in parallel.

Once the operating temperature has been reached, the proportional valve 19 can be closed and the proportional valve 18 can be opened. The reformer 4 is then supplied with fuel and the supplied fuel is reformed so that suitable reformed fuel gas can be supplied to the anodes of the fuel cells 1 for the electrochemical reaction with the air oxygen.

The exhaust gas to be conducted out of the operating heat exchanger 9 moves into the line 20 in which it is mixed with cold environmental air. This gas mixture can be emitted to the environment from the line 20 without danger due to the composition and to the reduced temperature. The volume flow and the desired temperature can be directly influenced with the help of the fan 21.

The air volume flow supplied to the start burner 5 and to the reformer 4 can be influenced by the fans 22 and 23.

The example shown in FIG. 2 corresponds in many points to the example of FIG. 1. A starter heat exchanger 7 is in this respect omitted. For this purpose, the exhaust gas of the start burner 5 is conducted directly into the cathodes of the fuel cells 1 and thus acts directly on them and in this respect a temperature increase is achieved up to the reaching of the operating temperature of the fuel cells 1.

The exhaust gas is here also conducted to the reformer 4 and to the operating heat exchanger 9, both in the heating phase and in normal fuel cell operation, so that the residual heat can also be utilized.

In normal operation, this example is operated like the example of FIG. 1.

The example in accordance with FIG. 3 differs from the example in accordance with FIG. 2 in that, in addition to the waiving of a starter heat exchanger 7, no separate fan 22 is present for the supply of air to the start burner 5, either, whereby the system is further simplified and less energy is required for operation.

The perspective illustration in FIG. 4 is intended to show a suitable structure and an advantageous arrangement of components by way of example at a system.

Stacked fuel cells 1 are arranged vertically at the top here and the afterburner 2 next to them. An adapter plate 3 is arranged between the starter heat exchanger 7 and the stacked fuel cells 1. The starter heat exchanger 7 and the operating heat exchanger 9 are separated from one another by an intermediate plate 24. The start burner 5 is fastened at the outside and the exiting exhaust gas is conducted through the starter heat exchanger 7 in which the cold feed air can be heated and the heated feed air can then be supplied to the cathodes of the high-temperature fuel cells 1 through a channel formed in the adapter plate 3.

The afterburner 2 is attached directly next to the fuel cells 1 and above and in direct proximity to the reformer 4.

The cold feed air is supplied via the line 15 and is immediately split into two air flows. Cold air for the start burner 5 can thereby be supplied to the reformer 4 and, in normal operation of the system, to the cathodes of the fuel cells 1. On the splitting, the air used for the cooling and mixed in with the exhaust gas to be discharged to the environment can be branched off. This is also illustrated by the line 25.

This is also illustrated with the assistance of the exploded representation in FIG. 5. It is also easily recognizable in this respect that a coupling plate 6 may be present. The connection for the hot exhaust gases of the start burner 5 can take place thereat. The hot exhaust gas of the start burner 5 can flow directly to the starter heat exchanger 7 through the channels in the coupling plate 6. In addition, channels or openings are formed in the coupling plate 6 and the heated air can flow through them through further channels or openings in the adapter plate to the cathodes of the fuel cells 1.

FIG. 6 shows a further example of a system in accordance with the invention perspectively. In this respect, the afterburner 2 is arranged directly beneath the stacked fuel cells 1 and surrounds the reformer 4, as is also further illustrated in FIG. 10.

An adapter plate 6 adjoins this and channels for the air conduction and fuel conduction are formed in said adapter plate. The operating heat exchangers 9 and the start burner 5 are flanged to the adapter plate.

The air for the operation is supplied via the line 15 and the exhaust gas mixed with fresh air can be led off to the environment via the line 20.

The flow of air can also be recognized by the exploded representation of FIG. 7 by the solid arrows and the flow of the hot exhaust gas of the start burner 5 by the dashed arrows and of the fuel from the reformer 4 by the dotted arrows.

The air and fuel can be supplied to the start burner 5 and to the reformer 4 via the mixing pipes 28 and 29.

An onflow plate 27 having channels closes the operating heat exchanger 9 at the lower side.

The reformer 4 is shown such that it can be introduced into a corresponding receiver which is formed at the afterburner 2. During operation, the reformer 4 can thus utilize the heat of the afterburner 2, which is output to the outside by radiation, convection and heat conduction, in addition to its heating.

In the examples shown in FIGS. 6, 7 and 8, an adapter plate 3a is arranged between the high-temperature fuel cells 1 and the afterburner 2. This adapter plate 3a can be made analog or similar to the adapter plate 3. A turbulent flow of the exhaust gas mixture supplied to the afterburner 2 can be achieved in it and thereby its homogeneous mixing.

FIGS. 8 and 9 show another example which is made in a similar manner to the example shown in FIGS. 6 and 7. In this respect, the start burner 3 has been arranged directly between the operating heat exchanger 9 and the afterburner 2 and an adapter plate 6 has been dispensed with.

The start burner 3 can be arranged integrated in the operating heat exchanger 9.

FIG. 10 shows as a detail a reformer 4 arranged integrated in an afterburner 2. The afterburner 2 is formed as a catalytically coated porous foam body which is received in a housing 30. A receiver is formed in the interior of the afterburner 2 and the reformer 4 can be introduced into it with an exact fit. The reformer 4 is thus surrounded at all sides by the afterburner 2 with the exception of the feed of the mixing pipe 29.

In FIG. 11, a starter burner 5 is shown in a perspective sectional representation such as can be used in the invention. Here, too, a porous ceramic foam is received in a housing 31. The start burner 5 and the afterburner 2 can therefore be called pore burners. The latter have the advantage that they can be controlled ore regulated easily and with a low effort and/or cost, which in particular relates to the temperature of the exhaust gas in the start burner 5 and to the oxidizing in the afterburner 2 which should be as complete as possible. This takes place by the influencing of the fuel/air ratio $\lambda$. In this respect, the proportional valves and the fans are used, as can be seen from the description of FIGS. 1 to 3.

In the afterburner 2 shown in FIG. 12, the introduction of the exhaust gas mixture, which is formed with the exhaust gas flows from the anodes and the cathodes, takes place via a feed line, not shown here, from the bottom into the housing 31 through the inlet 31.1. The housing 31 is divided into two halves by a partition wall 31.6. The exhaust gas mixture is thereby first conducted in a rising manner through an open-pore structure 32 which is formed by an SSiC ceramic foam having a porosity of more than 80%. The exhaust gas mixture flow is deflected by 180° at the upper housing edge and moves through a channel 31.7 to the outlet 31.2. The outlet 31.2 has a restriction of the free cross-section in this afterburner 2 and is made as conically tapering in the direction of the environment.

The structure 32 arranged directly subsequently at the inlet 31.1 is formed graded with a catalytically active component with respect to the coating, with it being provided with a coating of aluminum oxide increasing the specific surface in a zone 31.5. Platinum and nickel are applied to the coating as catalytically active components. When flowed over, the exhaust gas mixture can thereby be catalytically (heterogeneously) postoxidized so that the portion of contaminants and hydrogen can be reduced to below the limit values prescribed by law. A zone 31.4 for a homogeneous oxidation reaction is arranged behind the inlet 31.1 in the direction of flow of the exhaust gas mixture and the structure 32 has no catalytically active component in said zone and is also not catalytically active.

Instead of the partition wall 31.6, however, the structure can also be made gas tight at the corresponding side so that it can form the wall to the channel 31.7.

It can be seen from the view shown in FIG. 12B that the lower side of the housing 31 has a part at the inlet 31.1 which is made as a perforated metal sheet and with which an optimized flow distribution over the cross-section of the combustion space disposed at the rear is realized.

In the example of an afterburner 2 shown in FIGS. 12A and 12B, a flow distribution is additionally achieved using a perforated metal sheet for the uniform onflow over the cross-section.

The invention claimed is:

1. A system having high-temperature fuel cells, having a reformer (4) connected upstream of the high-temperature fuel cells (1) at the anode side, a start burner (5) for the preheating of the cathodes of the high-temperature fuel cells, an afterburner (2) and an operating heat exchanger (9) by which the oxidizing agent can be supplied to the high-temperature fuel cell cathodes and which can be heated by the exhaust gas of the high-temperature fuel cells (1);

and exhaust gas conducted through the operating heat exchanger (9) flows into an exhaust gas line (20) together with environmental air and can be conducted off into the environment as cooled exhaust gas, wherein the exhaust gas of the start burner (5) can be supplied directly to the cathodes of the high-temperature fuel cells (1) for preheating the cathodes of the high-temperature fuel cells (1) by the exhaust gas.

2. A system in accordance with claim 1, characterized in that the reformer (4) is arranged directly next to the high-temperature fuel cells (1) and the afterburner (2) is arranged around the reformer (4).

3. A system in accordance with claim 1, characterized in that the high-temperature fuel cells (1) are made in plate shape and are stacked 4. A system in accordance with claim 1, characterized in that the start burner (5) and the afterburner (2) are made as pore burners, with the afterburner (2) being catalytically coated.

5. A system in accordance with claim 1, characterized in that the afterburner (2) and the reformer (4) are arranged between the high-temperature fuel cells (1) and the operating heat exchanger (9).

6. A system in accordance with claim 1, characterized in that the start burner (5) is integrated into the operating heat exchanger (9) or is arranged directly next to it.

7. A system in accordance with claim 1, characterized in that at least one adapter plate (6) or coupling plate (3), at which channels and/or openings for the fuel conduction and oxidizing agent conduction are present, is/are arranged between the operating heat exchanger (9) and/or the high-temperature fuel cells (1).

8. A system in accordance with claim 1, characterized in that the reformer (4) is a catalytic CPOx reformer.

9. A system in accordance with claim 1, characterized in that the reformer (4) can be heated by the exhaust gas of the afterburner (2) or by the exhaust gas exiting the high-temperature fuel cells (1) in that the exhaust gas flows around or flows through the reformer (4).

10. A system in accordance with claim 1, characterized in that an adapter plate (6) having an integrated mixture formation as a plate structure in which openings are formed in individual stacked plates so that a channel system is formed by means of the openings within the adapter plate (6), through which channel system reformed fuel gas and oxidizing agent can be supplied to the high-temperature fuel cells.

11. A system in accordance with claim 1, wherein the afterburner (2) includes a housing and a zone (31.4) is formed in said housing (31) of the afterburner (2), which zone is first flowed through by an exhaust gas mixture and in which only a homogeneous oxidation reaction takes place, without a catalytically influenced reaction of oxidizable components contained in the exhaust gas mixture, is arranged in the housing and, subsequent thereto, a second zone (31.5) is arranged in which a structure (32) within said housing (31) is made catalytically active.

12. A system in accordance with claim 1, characterized in that no additional connection is present for a supply of an additional fuel gas and oxygen or of a gas mixture containing oxygen at the afterburner (2).

13. A system having high-temperature fuel cells, having a reformer (4) connected upstream of the high-temperature fuel cells (1) at the anode side, a start burner (5) for the preheating of the cathodes of the high-temperature fuel cells, an afterburner (2) and an operating heat exchanger (9) by which the oxidizing agent can be supplied to the high-temperature fuel cell cathodes and which can be heated by the exhaust gas of the high-temperature fuel cells (1); and exhaust gas conducted through the operating heat exchanger (9) flows into an exhaust gas line (20) together with environmental air and can be conducted off into the environment as cooled exhaust gas, wherein the reformer (4) is arranged directly next to the high-temperature fuel cells (1) and the afterburner (2) is arranged around the reformer (4).

14. A system in accordance with claim 13, characterized in that the high-temperature fuel cells (1) are made in plate shape and are stacked.

15. A system in accordance with claim 13, characterized in that the afterburner (2) and the reformer (4) are arranged between the high-temperature fuel cells (1) and the operating heat exchanger (9).

16. A system in accordance with claim 13, characterized in that at least one adapter plate (6) or coupling plate (3), at which channels and/or openings for the fuel conduction and oxidizing agent conduction are present, is/are arranged between the operating heat exchanger (9) and/or the high-temperature fuel cells (1).

17. A system in accordance with claim 13, characterized in that the reformer (4) is a catalytic CNN reformer.

18. A system in accordance with claim 13, characterized in that the reformer (4) can be heated by the exhaust gas of the afterburner (2) or by the exhaust gas exiting the high-temperature fuel cells (1) in that the exhaust gas flows around or flows through the reformer (4).

19. A system in accordance with claim 13, characterized in that an adapter plate (6) having an integrated mixture formation as a plate structure in which openings are formed in individual stacked plates so that a channel system is formed by means of the openings within the adapter plate (6), through which channel system reformed fuel gas and oxidizing agent can be supplied to the high-temperature fuel cells.

20. A system in accordance with claim 13, characterized in that a zone (31.4) is formed in a housing (31) of the afterburner (2), which zone is first flowed through by an exhaust gas mixture and in which only a homogeneous oxidation reaction takes place, without a catalytically influenced reaction of oxidizable components contained in the exhaust gas mixture, is arranged in the housing and, subsequent thereto, a second zone (31.5) is arranged in which a structure (32) is made catalytically active.

* * * * *